S. CUPLIN.
Bee Hive.
No. 84,415. Patented Nov. 24, 1868.
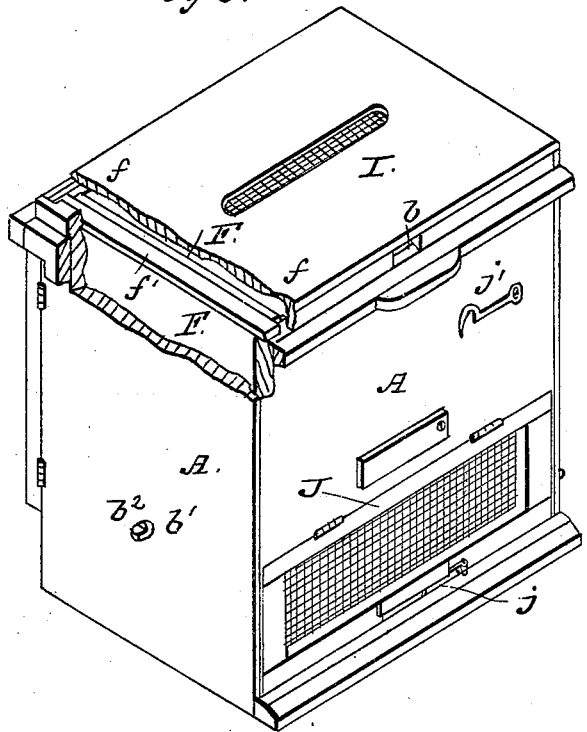
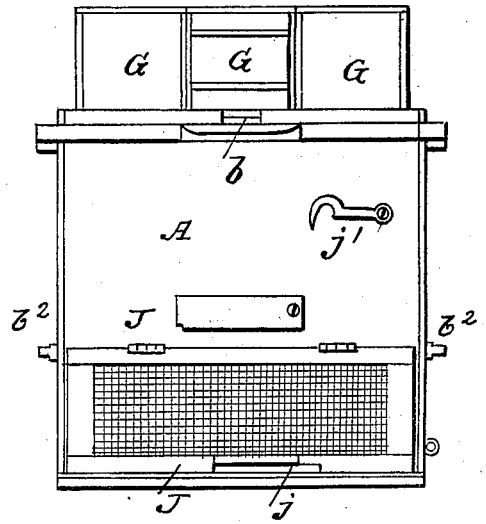
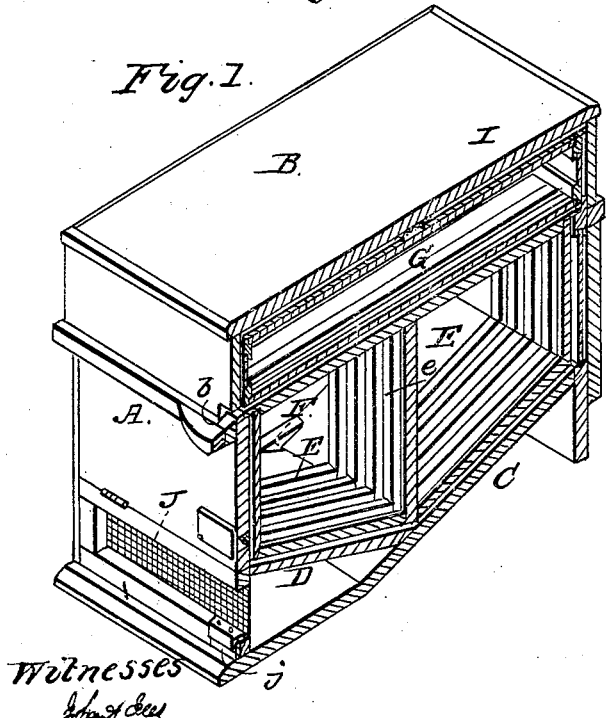
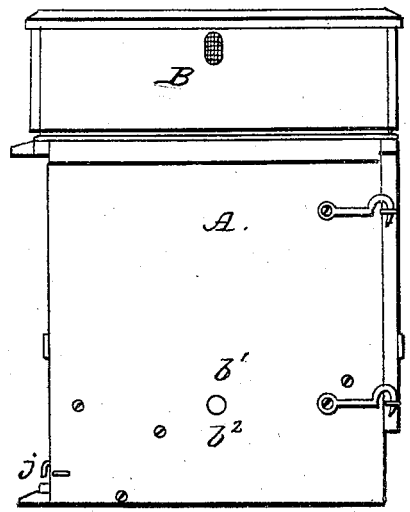

SAMUEL CUPLIN, OF IOWA FALLS, IOWA.

Letters Patent No. 84,415, dated November 24, 1868.

IMPROVEMENT IN BEE-HIVES.

The Schedule referred to in these Letters Patent and making part of the same.

*To all whom it may concern:*

Be it known that I, SAMUEL CUPLIN, of Iowa Falls, in the county of Hardin, and State of Iowa, have invented certain new and useful Improvements in Bee-Hives; and I do hereby declare that the following is a full, clear, and exact description thereof, reference being had to the accompanying drawings, and to the letters of reference marked thereon, which form a part of this specification, and in which—

Figure 1 represents a perspective section of my bee-hive;

Figure 2, a side view;

Figure 3 is a perspective, showing the cover and honey-boxes displaced, and a ventilating-cover or lid used instead; and also showing a portion of the casing of the hive broken away, so as to exhibit the adjustable or removable board on that side of the hive; and Figure 4 is a front view, with only the cap or cover removed, exhibiting the honey-boxes.

The nature of my invention consists in the employment, in a bee-hive, of two adjustable or removable boards, for the purpose of firmly retaining in position the comb-frames, and facilitating the removal of the same, and in the peculiar construction of the comb-frames.

To enable others skilled in the art to make and use my invention, I will now describe its construction and operation.

In the accompanying drawings—

A represents the casing of my bee-hive, which is furnished on its upper surface with the cap or cover B, and on its lower surface with the inclined and horizontal bottom C, and inclined or slanting piece or board D, which is made so as to come in contact with the lower part of the inclined portion of said bottom.

F F are the adjustable or removable boards, placed a short distance inward from the opposite sides of the casing A, as seen in fig. 1. These boards are held in place by vertical strips $f$, and removable strips $f$, and are designed to permit the comb-frames to be firmly held in place, and also easily be removed.

E E are the comb-frames, which are pointed at their lower ends, and strengthened or provided at the centre with the vertical bars $e$ $e$.

Upon these frames are placed the slatted bottoms of the honey-boxes G G.

When these boxes and the cap B are removed I use the slotted or ventilating-lid I, or cover, to prevent the bees from leaving the hive.

$b$ is an opening, through which the bees enter the hive, and $b^1$ $b^1$ exits for the same when caught or enclosed between the boards F and the sides of the casing A, and are stopped by the corks or stoppers $b^2$ $b^2$.

J is a hinged wire-gauze door, placed in the lower part of the casing A, and constructed with an opening, over which slides a metal plate, $j$, formed at one end with an eye, into which hooks a hook, $j'$, when thrown up to hold it (the door) open.

What I claim, and desire to secure by Letters Patent, is—

1. The removable boards F F, held in place by the strips $f$ $f$, and used for the purpose of retaining firmly in position the comb-frames, and facilitating the removing of the same.

2. The comb-frames E E, constructed, arranged, and operated substantially as described.

3. Casing A, cover B, honey-boxes G G, ventilating-lid I, comb-frames E E, removable or adjustable boards F F, strips $f$ and $f'$, horizontal and inclined bottom C, inclined board D, and door J, all constructed and arranged substantially as and for the purpose set forth.

In testimony that I claim the foregoing as my own, I affix my signature in presence of two witnesses.

SAMUEL CUPLIN.

Witnesses:
O. W. GARRISON,
D. V. ELLSWORTH.